(12) United States Patent
Fontanez Canuelas

(10) Patent No.: US 12,310,475 B2
(45) Date of Patent: May 27, 2025

(54) TRANSITION CONTACT LENS CHANGER CASE

(71) Applicant: Omar R. Fontanez Canuelas, San Juan, PR (US)

(72) Inventor: Omar R. Fontanez Canuelas, San Juan, PR (US)

( * ) Notice: Subject to any disclaimer, the term of this patent is extended or adjusted under 35 U.S.C. 154(b) by 387 days.

(21) Appl. No.: 17/988,046

(22) Filed: Nov. 16, 2022

(65) Prior Publication Data

US 2023/0165348 A1 Jun. 1, 2023

Related U.S. Application Data

(60) Provisional application No. 63/264,594, filed on Nov. 26, 2021.

(51) Int. Cl.
| | | |
|---|---|---|
| *A45C 11/04* | (2006.01) | |
| *A45C 11/00* | (2006.01) | |
| *A45C 13/00* | (2006.01) | |

(52) U.S. Cl.
CPC .......... *A45C 11/005* (2013.01); *A45C 13/001* (2013.01); *H01M 2220/30* (2013.01)

(58) Field of Classification Search
CPC ... A45C 11/005; A45C 11/046; A45C 13/001; H01M 2220/30; Y01S 134/901

USPC ................. 206/5, 5.1, 6; 132/288; 134/901; 362/154

See application file for complete search history.

(56) References Cited

U.S. PATENT DOCUMENTS

| | | | | |
|---|---|---|---|---|
| 7,042,805 | B1 * | 5/2006 | Kallman | A45C 11/005 368/242 |
| 7,331,449 | B2 * | 2/2008 | Pinchassi Dar | A61L 12/086 134/901 |
| 8,522,795 | B2 * | 9/2013 | Bouix | A45D 33/26 206/349 |
| 2005/0133382 | A1 * | 6/2005 | Gerard | A45C 11/005 206/5.1 |
| 2005/0186128 | A1 * | 8/2005 | Pinchassi Dar | A45C 11/005 422/300 |
| 2007/0284263 | A1 * | 12/2007 | Giardina | A45C 13/001 206/5.1 |
| 2013/0308428 | A1 * | 11/2013 | Westcott | A45C 15/04 368/10 |
| 2016/0209024 | A1 * | 7/2016 | Sale | A45C 13/02 |

* cited by examiner

*Primary Examiner* — Luan K Bui
(74) *Attorney, Agent, or Firm* — Luis Figarella

(57) ABSTRACT

A portable transitional contact lens storage case for the storage of photochromic contact lenses so that they may be safely stored and pre-transition from the clear, non-darkened normal state to their darkened state while still in the case through the exposure of the lens to a controlled Ultraviolet (UV) and/or High-Energy Visible (HEV) light source.

1 Claim, 10 Drawing Sheets

TRANSITION CONTACT LENS CHANGER CASE

CROSS-REFERENCE TO RELATED APPLICATIONS

This application claims priority to U.S. Provisional patent applications Ser. No. 63/264,594 titled "Contact Lens Trans changer case", filed on Nov. 26, 2021, the disclosure of which is herein incorporated by reference in its entirety.

PATENTS CITED

The following documents and references are incorporated by reference in their entirety, Tsang et al (WO 2010/015990), Kernick et al (U.S. Pat. Pub. No. 2020/0365056) and Nozaki (JP 2011188978).

FIELD OF THE INVENTION

The invention relates to contact lens storage, and more particularly to the storage of photochromic contact lenses that are configured to change from a clear, non-darkened normal state to a darkened state when activated by exposure to Ultraviolet (UV) and/or High-Energy Visible (HEV) light.

DESCRIPTION OF THE RELATED ART

With the invention of photochromic contact lenses (also referred to as 'Transition lenses'), eye conditions such as hypermetropy and myopia with/without astigmatism can be easily corrected. This allows for the market offering of contact lens prescriptions for distance, intermediate and/or proximity eye conditions.

One interesting advantage of the photochromic lenses is that when 'transitioned', they provide an easier to handle item for their users. In short, it is easier to see them (thus handle them) while they are 'darkened' than while they are transparent, particularly when you consider that the wearer has no glasses on! What is needed, is a compact lens case that allows the user to activate a light source that will (through a brief light on period) show the lenses as fully transitioned when the user opens the case.

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

In one aspect, the invention is about a portable, self-powered transition contact lens changer case comprising: a top and a bottom portion, a built-in energy source, one or more pairs of optically transparent contact lens holders, one or more light sources capable of illuminating the interior of said case, including said lens holders, a mirror and user control electronics that activate said light sources. In another aspect said user control electronics include at least one of: On/Off Switch, Lid sensor and said one or more light sources include at least one of: Light emitting diodes (LEDs) in the UV range, LEDs in the visible range, white LEDs or UV bulbs. In yet another aspect said built-in energy source is one or more of: a disposable batter or a rechargeable battery. In another aspect said case has an external power port.

Other features and advantages of the present invention will become apparent upon examining the following detailed description of an embodiment thereof, taken in conjunction with the attached drawings, which are provided for purposes of illustration and not of limitation.

Figure 1:
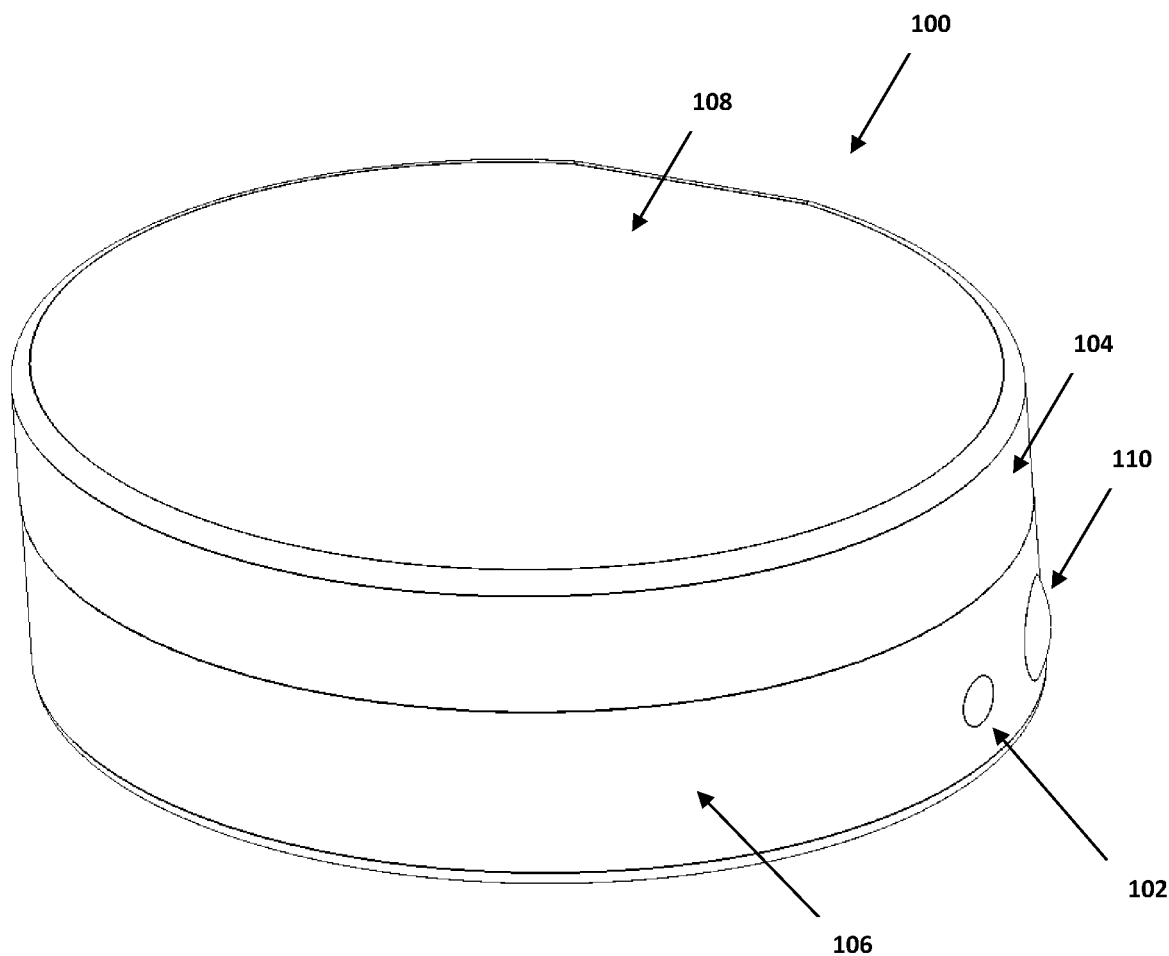
FIG. 1 shows a perspective view of the proposed case when closed, according to an exemplary embodiment of the invention.

The above-described and other features will be appreciated and understood by those skilled in the art from the following detailed description and drawings.

DETAILED DESCRIPTION OF THE INVENTION

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

Figure 2:
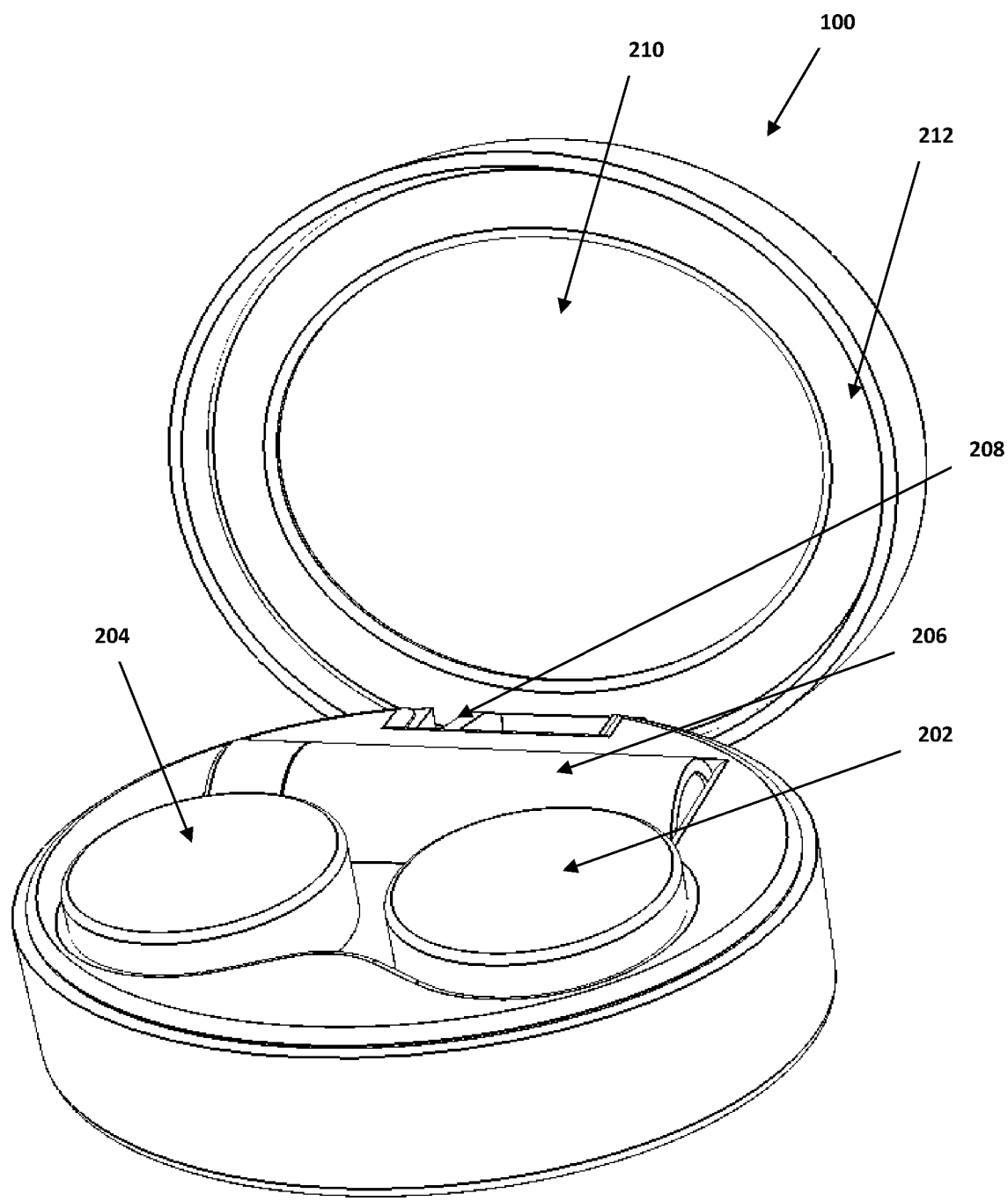
FIG. 2 shows a perspective view of the proposed case when open, according to an exemplary embodiment of the invention.
Figure 3:
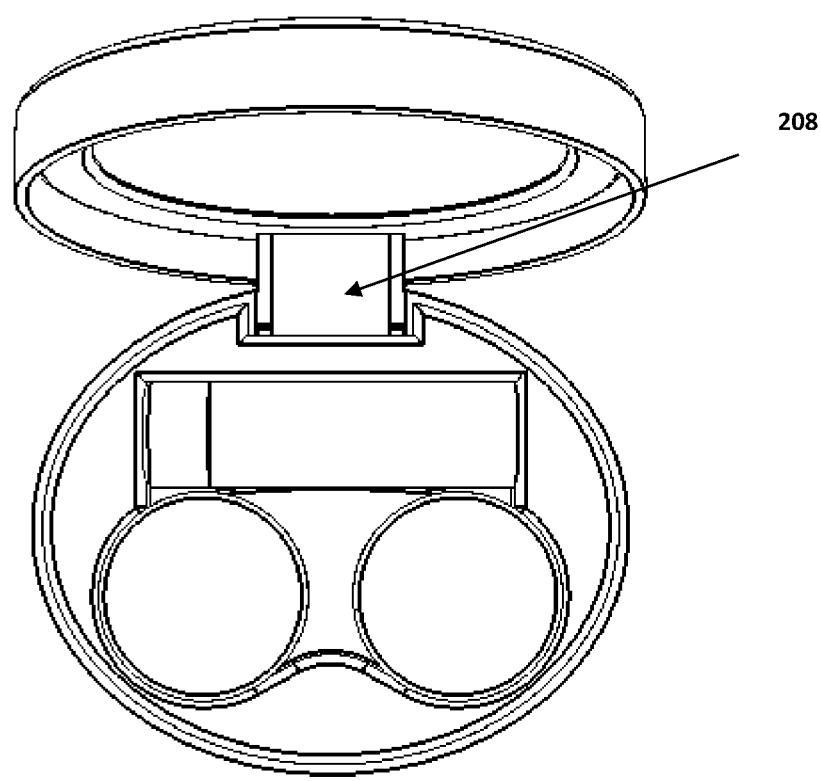
FIG. 3 shows a top view of the proposed case when open, according to an exemplary embodiment of the invention.
Figure 4:
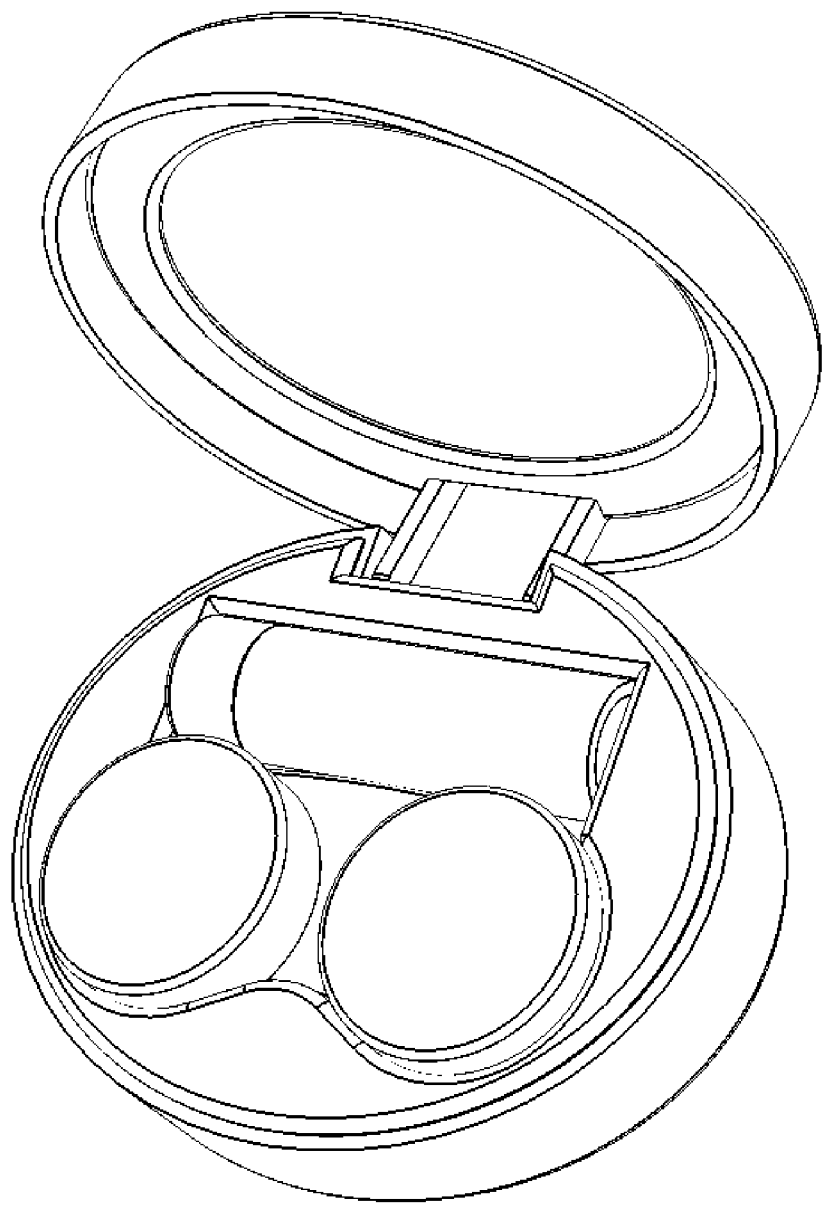
FIG. 4 shows another perspective view of the proposed case when open, according to an exemplary embodiment of the invention.
Figure 5:
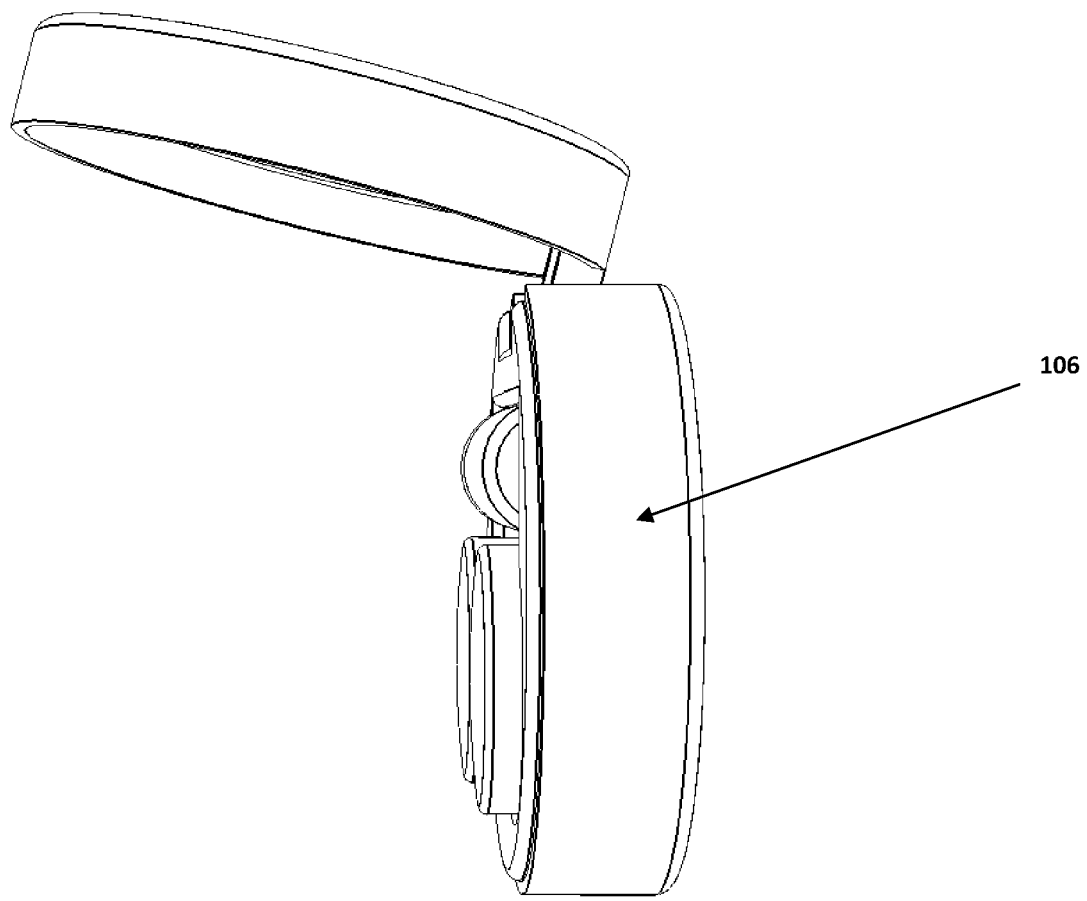
FIG. 5 shows a side view of the proposed case when open, according to an exemplary embodiment of the invention.
Figure 6:
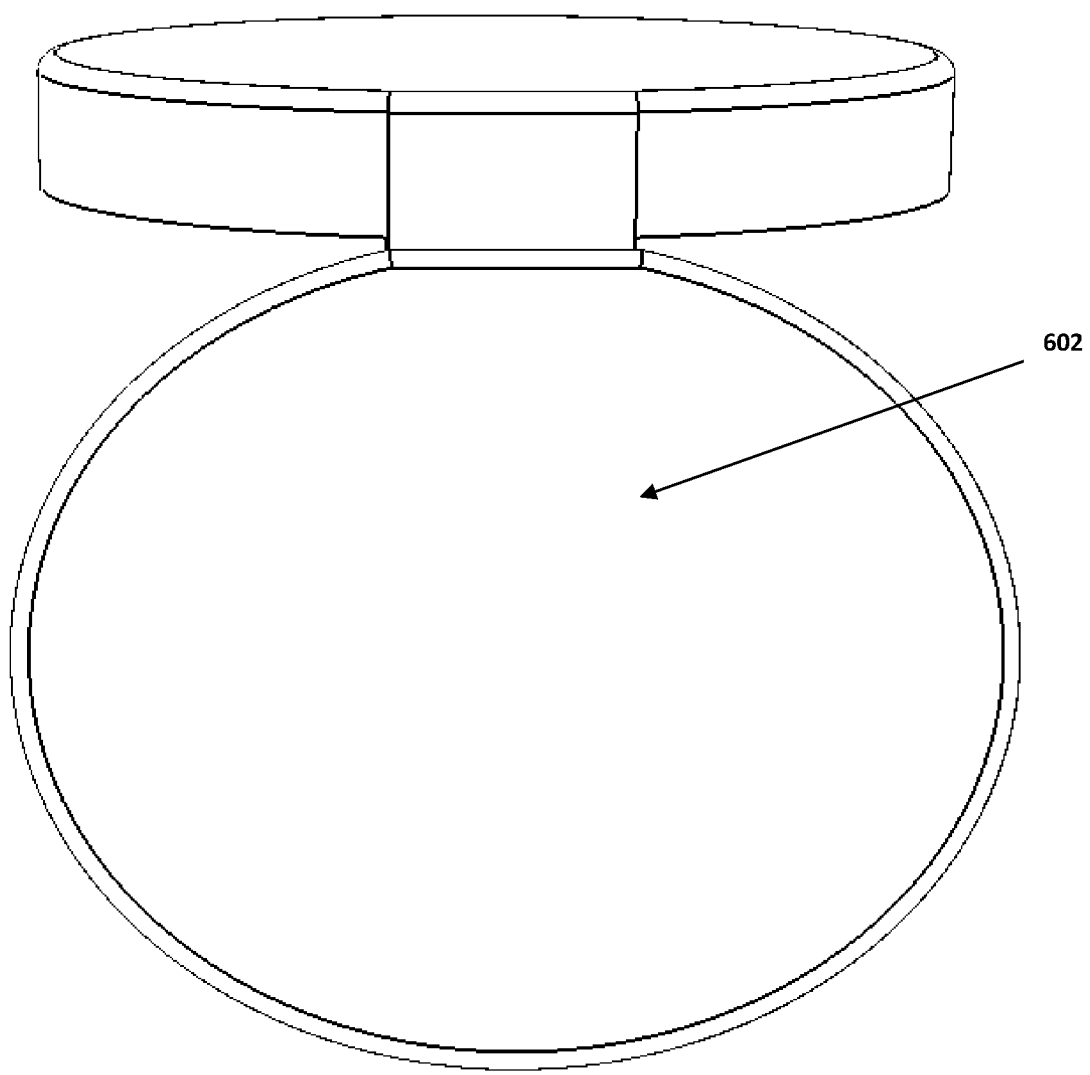
FIG. 6 shows a bottom view of the proposed case when open, according to an exemplary embodiment of the invention.
Figure 7:
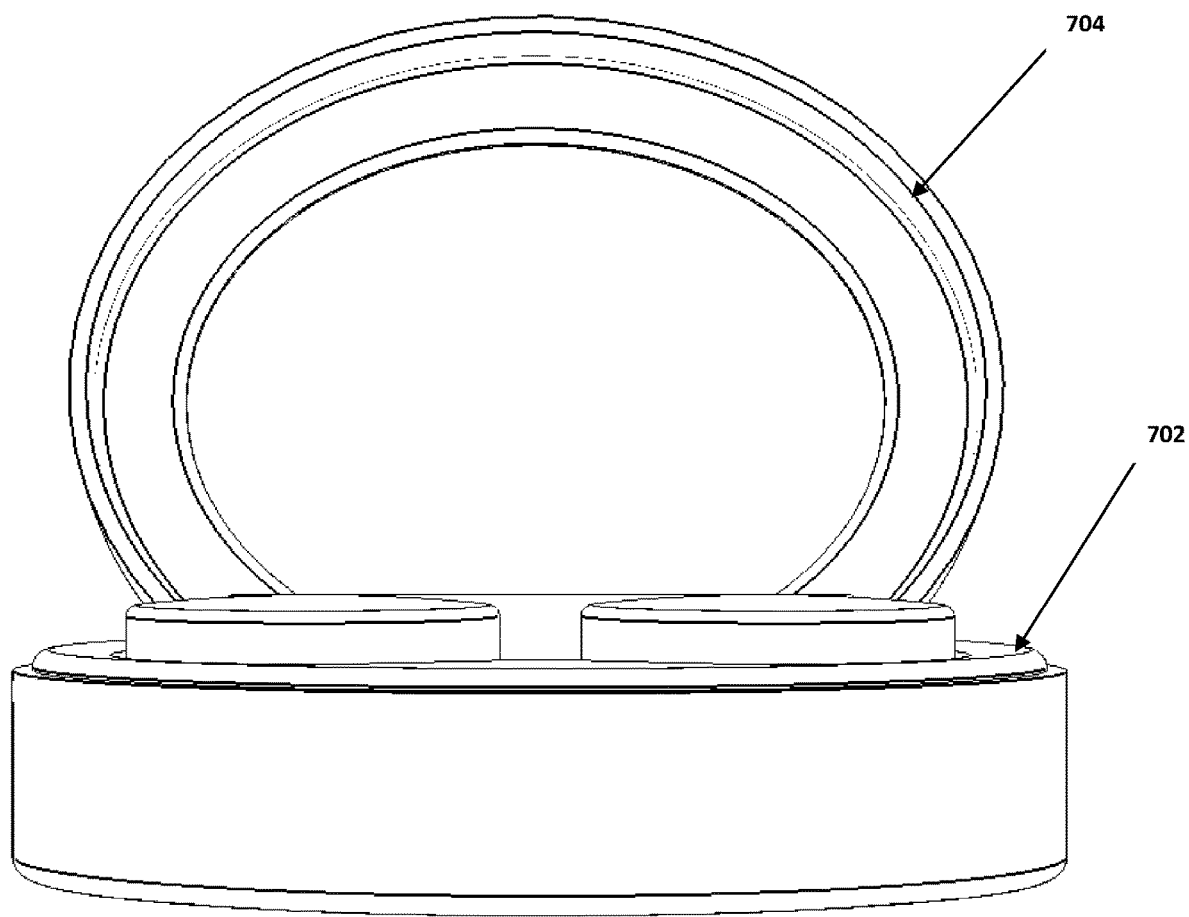
FIG. 7 shows a front view of the proposed case when open, according to an exemplary embodiment of the invention.
Figure 8:
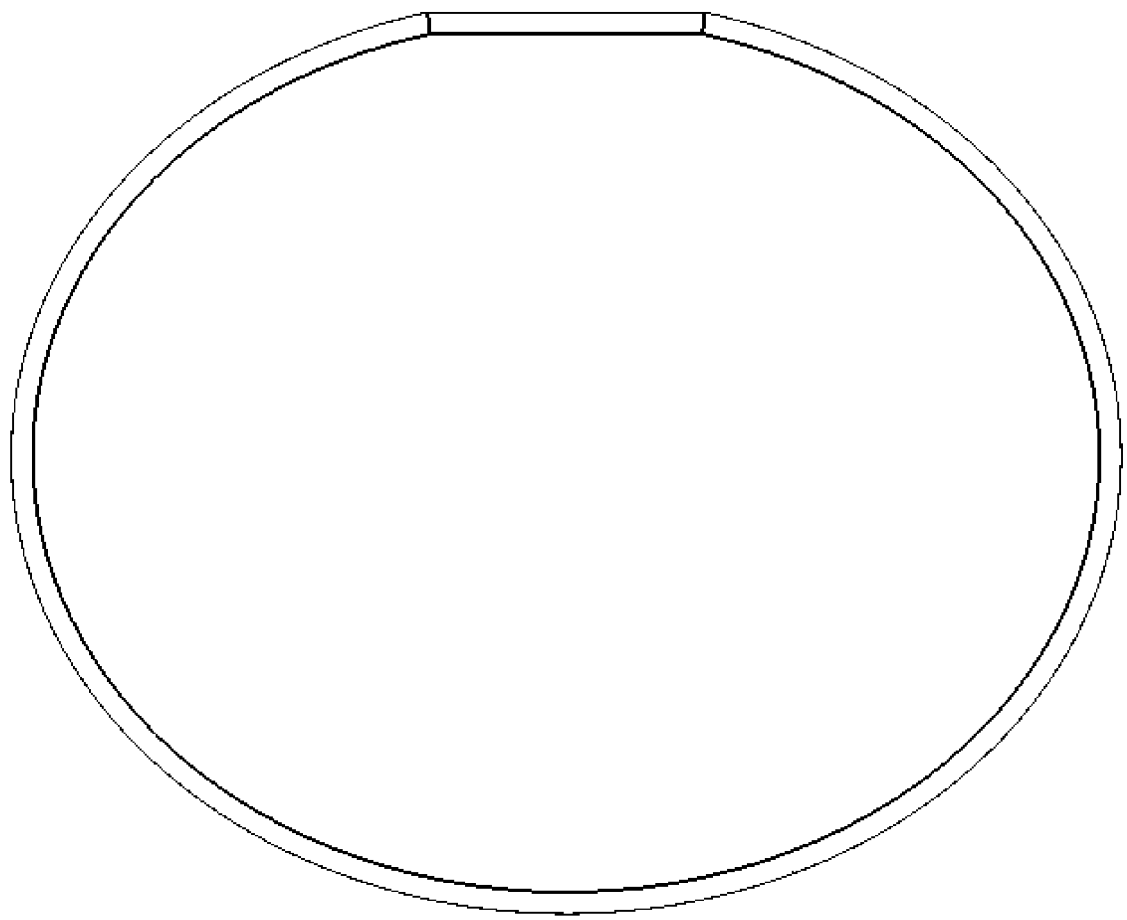
FIG. 8 shows a bottom view of the proposed case, according to an exemplary embodiment of the invention.
Figure 9:
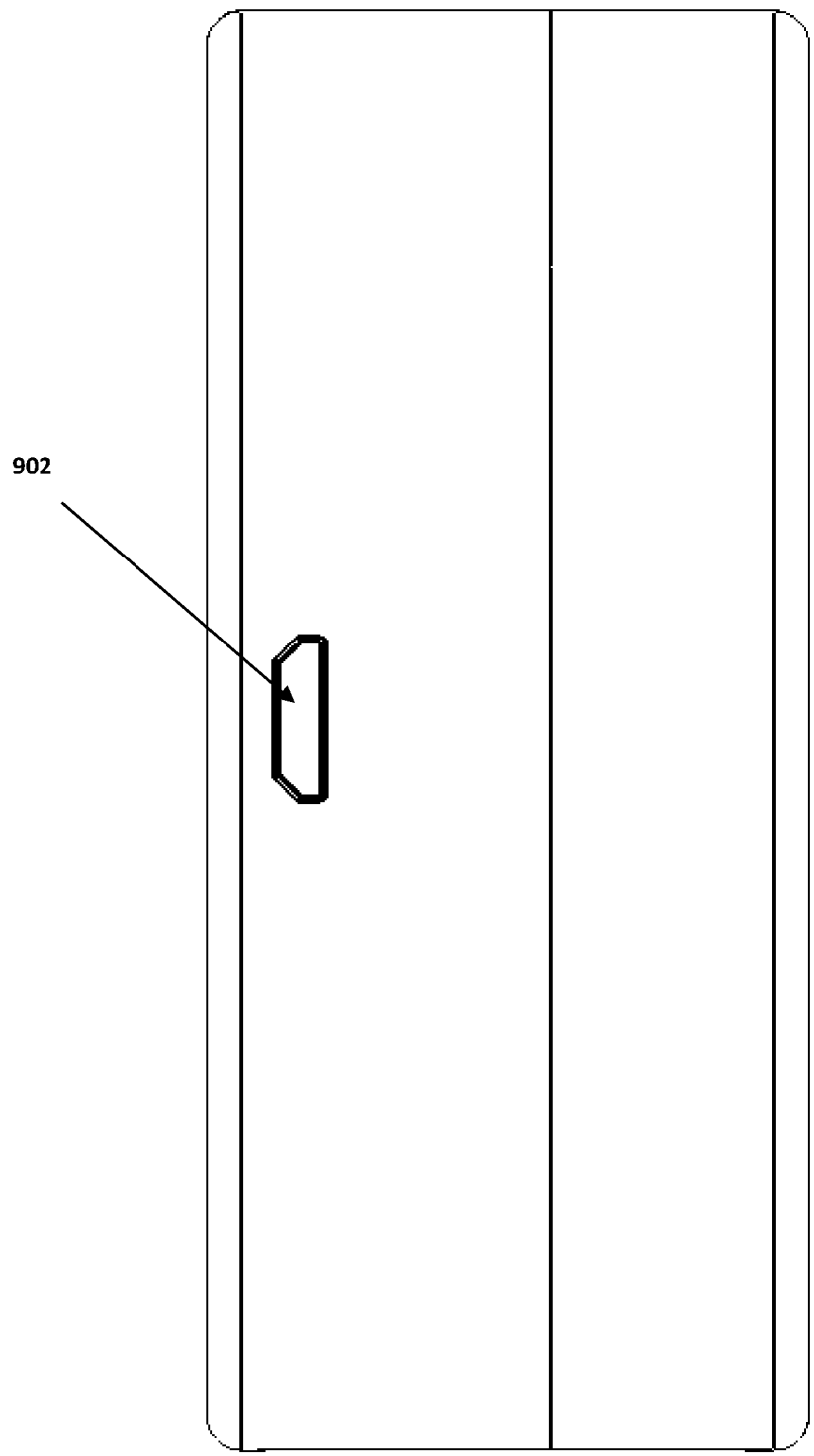
FIG. 9 shows a side view of the proposed case when closed, according to an exemplary embodiment of the invention.
Figure 10:
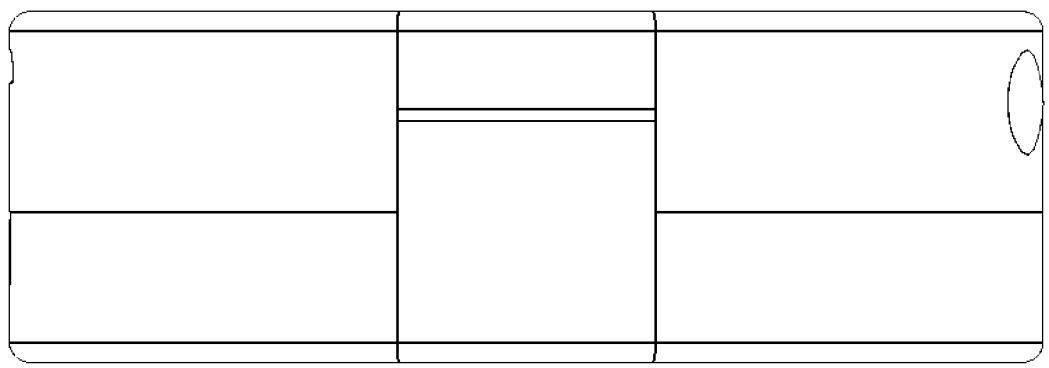
FIG. 10 shows a back view of the proposed case when closed, according to an exemplary embodiment of the invention.

The present invention referring to FIGS. 1-10 illustrate various perspectives of a proposed embodiments for a transitional contact lens case for photochromatic lenses (also called photochroma case or photochrome kit case or PCL case). These lenses are commonly prescribed to correct eye refractive conditions related to ophthalmology, optometry, optics, visual correction, etc. Photometric or 'transition' eye lenses have an internal matrix that changes colors in response to ultraviolet rays. Normally, this change in color occurs when a user is outdoors, allowing the lenses to quickly become the equivalent of sunshades.

Such lenses are taking over sunglasses, allowing users to receive eyesight protection from harsh light, while saving them the effort of bringing along an extra pair of eyeglasses. Additionally, these lenses also help indoors, where the various ultra-violet contributions from artificial light sources (LED lights, LED monitors, etc.), may be naturally reduced by the lenses.

The proposed case 100 (FIGS. 1-10) is, in one embodiment, comprised of two half portions (104, 106) which contains a built in energy source (e.g. rechargeable battery or disposable battery) that powers a light source 206 (be it an Ultra-violet light source and/or a High-Energy Visible (HEV) light) within the appropriate frequency band. So that when user activates it (via a button 110, Bluetooth cell phone control, switch or similar), the light is energized, so that after an appropriate length or time an external indication (LED changing colors 102, audio tone/beep and/or a signal to their phone) an indication is provided that there has been enough energy delivered to the optically transparent lens holders 202/204 to change their color as desired, preferably marked left/right, although not necessarily.

With these cases, the user can become accustomed to having lenses that are much more visible (they will be opaque when the case is open!), and that have transitioned to the desire color (from full transition to the any desired status) via a programmable period of time/intensity of the light. Since the unit is sealed, light levels that may be considered too strong, may now be easily attained, while ensuring through a lid sensor 208, that any harmful frequencies (say from an UV source or specific frequency LEDs within a light source 206 comprised of both UV and visible colors) are off when open.

In one embodiment, more than one light sources 206 are included within the case. A first source is an Ultra-violet (UV) LED, which causes the matrix within the lenses to transition in color. A second type, is a white LED, so that the user may use the mirror 210 within the case as an aid with which to put the lenses on, or as a compact.

As such, the U-V LEDs will either be completely off (or at a reduced, safe level) when a user may look at them (again, through a sensor 208 in the lid), while the white light is one when safe for a human to look. The on/off control may be as simple as a front switch on any of the outside case surfaces 104/106/108/602. An external power and/or battery charge port 902 may be a USB (Type C or similar), or any other suitable small charger slot (such as an Apple connector) connected along any of the outside case surfaces 104/106/108/602, or an induction contactless coupler such as Qi or similar.

The upper part of the case with the mirror 208 may have additional LEDs around the mirror area 210. have a mirror A, LED lights 102 (with the UV being either separate LEDs and/or electronic control of the blue/UV portion of a white LED. The lower portion has a number of spots to store the lenses, preferably marked left/right. Additional space may be utilized for a cleaning/disinfecting solution bottle(s). An additional control system may be a simple push button, or a slide.

The transitional energy control (the time the UV or appropriate frequency LEDs are activated) may have a minimal timer hold (with specific times for the various contact lens brands) that will ensure the lenses have received enough energy to be activated, while the white LED may have a longer period to ensure the user has fitted the lenses. A solid rim 702/704 or similar seal ensures any harmful light stays within the enclosure.

The proposed case 100 offers the opportunity for the best use of the contact lens matrix color changer for the proper use of this kind of technology that depends on the ambient changes. This case will initiate the modality of how transition contacts will establish a strong market related product needed for this kind of technology implementation. The use of this device will positively impact contact lens users in search for better quality and characteristics comfortability for all contact lens users.

In addition, the proposed case 100 simplifies the methodology and use of the regular transition methods for our users. It offers ease of identification of each contact lens for the advantage of the users. The case offers a variety of integrated technologies to better manage the different artificial light use for a proper lens insertion. The lens color change provides contrast that is necessary for the optimal identification of each contact lens to obtain the best lens fitting solutions available to the user.

The case provides the white LED to ensure that users will see the lenses within the case always, including bright solar conditions, no light, poor light or any other likely light condition. This technology will implement tight patient cooperation to ensure how they can adapt to new conditions in everyday use for prescribed lenses.

CONCLUSION

In concluding the detailed description, it should be noted that it would be obvious to those skilled in the art that many variations and modifications can be made to the shown embodiments without substantially departing from the principles of the present invention. Also, such variations and modifications are intended to be included herein within the scope of the present invention as set forth in the disclosure.

It should be emphasized that the above-described embodiments of the present invention, particularly any "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention.

The invention claimed is:

1. A portable, self-powered transition contact lens changer case comprising:
a top and a bottom portion;
a built-in energy source;
one or more pairs of optically transparent contact lens holders;
one or more light sources capable of illuminating the interior of said case, including said lens holders;
a mirror;
user control electronics that activate said one or more light sources;
wherein said user control electronics include at least one of:
On/Off switch and lid open/close position sensor;
said one or more light sources include at least one of:
light emitting diodes (LEDs) in the UV range plus additional LEDs in the visible range and white LEDs or UV bulbs;
said built-in energy source is one or more of:
a disposable battery or a rechargeable battery; and
said case has an external power port.

* * * * *